3,206,505
PROCESS FOR PURIFYING ISOPHTHALIC ACID

Frank Joseph Christoph, Jr., Wilmington, Del., and Duncan J. Crowley, Layton Lake, N.J., assignors to E. I. du Pont de Nemours and Company, Wilmington, Del., a corporation of Delaware
No Drawing. Filed Apr. 9, 1962, Ser. No. 185,801
4 Claims. (Cl. 260—525)

This invention relates to a process of producing isophthalic acid in a state of high purity. More particularly, this invention deals with a process for purifying commercial grades of isophthalic acid, where the impurity consists chiefly of by-product aromatic carboxylic acids, and where the total amount of said impurities does not exceed 5% by weight of the entire mass.

Isophthalic acid has in recent years been obtained by oxidation of meta-xylene, which in turn is derived from petroleum distillates. The original material, however, is naturally contaminated with para-xylene and toluene, as a result of which the isophthalic acid obtained is likewise contaminated with terephthalic acid, toluic acid and benzoic acid. The bulk of these by-products, however, are readily separable, and accordingly commercial grades of isophthalic acid seldom contain more than 2%, in extreme cases 5%, of such impurities, and the major portion of the latter is generally terephthalic acid. Yet, for certain chemical purposes this residual quantity of impurities is objectionable, and there is an urgent need for isophthalic acid of higher chemical purity.

Accordingly, it is an object of this invention to provide a practical process for producing high-grade isophthalic acid from commercial grades thereof which contain aromatic carboxylic acids, chiefly terephthalic acid, as the impurity and wherein the total of such impurities does not exceed 5% by weight of the whole. Other objects and achievements of this invention will become apparent as the description proceeds.

Now, according to our invention the above objects are achieved neatly and in an economical manner by treating the commercial solid mass with organic bases which preferentially solubilize the terephthalic acid content of the mass (and incidentally also the monocarboxylic acids). For instance, an aqueous slurry of the impure isophthalic acid may be treated with a water-soluble, nitrogenous organic base such as pyridine or hexamethylene tetramine, whereupon the dissolved impurities together with excess organic base, if any, may be separated in any convenient manner from the solid bulk of isophthalic acid. In this manner, the isophthalic acid component of the mass is maintained in acid form and need not be reconverted after separation as would be required in a process which neutralizes the entire mass.

The mentioned aqueous treatment is best carried out at about 80° to 100° C., preferably 90° to 95° C., and the quantity of organic base employed is between 1 and 25 parts, preferably between 5 and 12 parts, by weight for each 100 parts of the crude acid. Sufficient water is employed to provide a readily stirrable slurry of the mass being treated. Excessive quantities are to be avoided, however, because they needlessly increase the size of apparatus required and also tend to increase losses of the desired product through solution in the filtrates. A good rule to follow is to use 1 to 5 parts of water per part of the acid mass to be purified.

The length of treatment at said temperature may vary from 1 minute to 4 hours, depending upon the base selected and the total quantity of the mass being treated. The slurry is then cooled to about 70° to 75° C., filtered hot, washed with hot water and dried.

Suitable organic bases for the practice of this invention are water-soluble carbon compounds containing trivalent nitrogen and may be exemplified by urea, hexamethylenetetramine, pyridine, hexamethylenediamine, mono-, di- and trimethylamine, mono-, di- and triethylamine, the various ethanolamines, piperidine, piperazine, morpholine, and metaphenylenediamine. For the purpose of this invention, an organic nitrogenous base is considered water-soluble if it dissolves to a concentration of at least 5% by weight.

The quantity of organic base to be used is preferably in excess of the stoichiometric amount required to neutralize the acidic impurities in the crude mass. The theoretical amount required can be readily calculated, if the percentage of impurities has been determined, and if it be considered in its entirety as terephthalic acid and if we assume neutralization of but one of the COOH groups. Customarily, however, from 3 to 7 times this theoretical amount will be employed, to give a speedy reaction and to assure as nearly complete as possible solubilization of the impurities. But as already indicated, a thumb-rule use of about 1 to 25 parts of the base, and preferably 5 to 12 parts, per 100 parts of crude acid gives satisfactory results.

Without limiting this invention, the following examples are given to illustrate our preferred mode of operation. Parts mentioned are by weight.

Example 1

600 parts of water and 150 parts of commercial grade isophthalic acid (98% purity) are introduced into a vessel equipped with reflux condenser and agitator. After heating the suspension to 95° to 100° C., 7.5 parts of hexamethylenetetramine are added, and the mixture is stirred at 95° to 100° C. for 2 hours. The mass is then cooled to about 70° C., filtered while hot, washed with hot water and dried in an oven.

To test the purity, a representative portion of this dry product is converted to the acid chloride by treatment with phosgene in an inert solvent in the presence of a small amount of dimethylformamide. The solvent and catalyst are then distilled off under a vacuum, and are followed by distillation of the acid chloride. The essentially white isophthaloyl chloride thus recovered has a freezing point of 43.60° C., which is equivalent to a purity of 99.2%.

Example 2

600 parts of water and 200 parts of commercial grade isophthalic acid (98% purity) are introduced into a vessel equipped with reflux condenser and agitator. After warming up the suspension to 95° to 100° C., 5 parts of hexamethylenetetramine are added, and the mass is held with stirring for one hour at 95° to 100° C. Agitation is then stopped, and the contents are allowed to settle for 5 to 10 minutes, forming a clear supernatant aqueous phase. Most of this phase (about 400–500 parts) is removed and replaced by an equal amount of hot water. After adjusting the temperature to 95° to 100° C., another 5 parts portion of hexamethylenetetramine is added, and the mixture is held at 95° to 100° C. with stirring for an hour. The supernatant liquid is then separated, and the treated mass is washed with hot water (70° C.), by decantation. Hexane is added to the wet acid cake, and the mass is dehydrated by distilling off water and hexane.

To test the purity of the product, a sample of the dehydrated acid is phosgenated in hexane and then isolated as is Example 1. The resulting chloride has a purity of 99.3%, as indicated by a freezing point of 43.65° C.

Example 3

By following the details of Example 1, 10 parts of pyridine are added to a slurry of 600 parts of water and 200 parts of commercial grade isophthalic acid (98% purity) at 95°–100° C. with stirring. After 2 hours at this temperature, the slurry is filtered, washed and dried. When converted for test purposes into isophthaloyl chloride, the latter is found to have a freezing point of 43.41° C., which is equivalent to a purity of 98.8%.

*Example 4*

By following the details of Example 1, 7.5 parts of urea are added, with stirring, to a slurry of 150 parts of commercial grade isophthalic acid (98% purity) in 600 parts of water at 95° to 100° C. After 2 hours stirring at this temperature, the slurry is filtered, washed and dried. The freezing point of the isophthaloyl chloride derived from this product is 43.47° C., which is equivalent to an acid purity of 98.9%.

In a similar manner, commercial isophthalic acid can be purified by the aid of any other of the water-soluble nitrogenous organic bases hereinabove named. Other details of procedure may likewise be varied within the skill of those engaged in this art.

We claim as our invention:

1. A process of purifying a solid mass of isophthalic acid containing organic acid impurities in which terephthalic acid is the chief constituent and the total quantity of impurities does not exceed 5% by weight of the whole, which comprises treating an aqueous slurry of said mass, at a temperature of 80° to 100° C., with a trivalent water-soluble nitrogenous organic base in quantity sufficient to solubilize the impurities by salt-formation without substantially solubilizing the bulk of isophthalic acid in the mass, and separating the aqueous phase containing the water-solubilized impurities from the solid bulk of isophthalic acid mass.

2. A process as in claim 1, the quantity of said organic base employed being from 3 to 7 times the quantity required to neutralize the quantity of impurities in the mass when said quantity is calculated as being entirely terephthalic acid and when it is assumed that only one of the COOH groups of said acid is being neutralized.

3. A process as defined in claim 1 wherein said organic base is hexamethylenetetramine.

4. A process of purifying a solid mass of isophthalic acid containing organic acid impurities in which terephthalic acid is the chief constituent and the total quantity of impurities does not exceed 5% by weight of the whole, said process comprising the steps of (1) contacting and treating an aqueous slurry of said isophthalic acid containing said impurities, at a temperature between 80° C. and 100° C., with between 1 and 25 parts by weight of a trivalent water soluble nitrogenous organic base per 100 parts of said total mass, thereby solubilizing the impurities by salt formation without substantially solubilizing the solid isophthalic acid mass, and (2) filtering off solid isophthalic acid from said aqueous slurry while maintaining the temperature at about 70° C. to 75° C.

References Cited by the Examiner

UNITED STATES PATENTS

| | | | |
|---|---|---|---|
| 1,945,246 | 1/34 | Witzel | 260—525 X |
| 2,664,440 | 12/53 | Toland | 260—525 |
| 2,729,674 | 1/56 | McKinnis | 260—525 X |
| 2,742,496 | 4/56 | Lum et al. | 260—525 X |
| 2,745,872 | 5/56 | Carlston et al. | 260—525 |
| 2,829,160 | 4/58 | Stehman et al. | 260—525 |
| 3,051,746 | 8/62 | Toland | 260—525 |
| 3,059,025 | 10/62 | Knobloch et al. | 260—525 |

OTHER REFERENCES

Ostwald: Z. für Physikalische Chemie, 3, pp. 376–7.

LORRAINE A. WEINBERGER, *Primary Examiner.*

LEON ZITVER, *Examiner.*